US 10,236,769 B2

(12) United States Patent
Kim et al.

(10) Patent No.: US 10,236,769 B2
(45) Date of Patent: Mar. 19, 2019

(54) SWITCH CONTROL CIRCUIT (71) Applicant: FAIRCHILD KOREA SEMICONDUCTOR LTD., Bucheon (KR)

(72) Inventors: Taesung Kim, Yeongtong-gu (KR); Dong-Jin Park, Bucheon-si (KR); Seung-Uk Yang, Dongan-gu (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 9 days.

(21) Appl. No.: 15/797,994

(22) Filed: Oct. 30, 2017

(65) Prior Publication Data
US 2018/0048227 A1    Feb. 15, 2018

Related U.S. Application Data (62) Division of application No. 14/446,502, filed on Jul. 30, 2014, now Pat. No. 9,837,893.

(30) Foreign Application Priority Data

Jul. 24, 2014  (KR) .................. 10-2014-0094251

(51) Int. Cl.
*H02M 1/14* (2006.01)
*H02M 3/07* (2006.01)
(Continued)

(52) U.S. Cl.
CPC ............ *H02M 3/073* (2013.01); *H02M 1/14* (2013.01); *H02M 3/156* (2013.01); *H02M 1/12* (2013.01);
(Continued)

(58) Field of Classification Search
CPC .. H02M 2001/0022; H02M 1/12; H02M 1/14; H02M 1/143; H02M 1/15; H02M 1/4225; H02M 3/156; H02M 3/33507
See application file for complete search history.

(56) References Cited

U.S. PATENT DOCUMENTS 5,282,126 A    1/1994  Husgen
5,455,758 A    10/1995 Pelly
(Continued)

FOREIGN PATENT DOCUMENTS

EP    2765697       8/2014
EP    3101798 A2 *  12/2016  ............. H02M 1/12

OTHER PUBLICATIONS

Fairchild Semiconductor, "FL7701 Smart LED Lamp Driver IC with PFC Function," Jun. 2013, 13 pages.

*Primary Examiner* — Fred E Finch, III
(74) *Attorney, Agent, or Firm* — AMPACC Law Group, PLLC (57) ABSTRACT

A charge pump includes: a first diode that is connected to a first node; a second diode that is connected to a second node; a pump capacitor that is connected to a third node to which the first diode and the second diode are connected; a power supply capacitor that is connected to the pump capacitor; a third diode that is connected between the pump capacitor and the power supply capacitor; and a zener diode that is connected in parallel to the third diode and the power supply capacitor. A power supply device decreases a ripple of an output current using a ripple reduction signal.

19 Claims, 10 Drawing Sheets

Related U.S. Application Data (60) Provisional application No. 61/860,488, filed on Jul. 31, 2013.

(51) Int. Cl.
*H02M 3/156* (2006.01)
*H02M 3/335* (2006.01)
*H02M 1/12* (2006.01)
*H02M 1/00* (2006.01)

(52) U.S. Cl.
CPC .... *H02M 3/335* (2013.01); *H02M 2001/0006* (2013.01)

(56) References Cited

U.S. PATENT DOCUMENTS

| | | | |
|---|---|---|---|
| 5,689,176 A * | 11/1997 | Deloy | H02M 1/4225 323/222 |
| 5,767,631 A | 6/1998 | Konopka et al. | |
| 5,859,768 A | 1/1999 | Hall et al. | |
| 6,188,274 B1 | 2/2001 | Vernon | |
| 6,359,715 B1 | 3/2002 | Imajo | |
| 6,984,963 B2 | 1/2006 | Pidutti et al. | |
| 7,433,211 B1 * | 10/2008 | Collmeyer | H02M 1/4225 323/282 |
| 7,525,259 B2 | 4/2009 | Weirich | |
| 2001/0024113 A1 | 9/2001 | Goyhenetche et al. | |
| 2003/0205974 A1 | 11/2003 | Kuehner et al. | |
| 2004/0051479 A1 | 3/2004 | Weirich | |
| 2005/0068796 A1 * | 3/2005 | Morita | H02M 1/4225 363/120 |
| 2005/0190586 A1 | 9/2005 | Radzinski et al. | |
| 2005/0212587 A1 | 9/2005 | Meek et al. | |
| 2005/0270814 A1 * | 12/2005 | Oh | H02M 1/4225 363/98 |
| 2006/0119337 A1 * | 6/2006 | Takahashi | G05F 1/70 323/282 |
| 2006/0273737 A1 | 12/2006 | Heckmann | |
| 2007/0036212 A1 * | 2/2007 | Leung | H02M 1/42 375/238 |
| 2010/0208500 A1 | 8/2010 | Yan et al. | |
| 2010/0302815 A1 | 12/2010 | Li et al. | |
| 2011/0261596 A1 | 10/2011 | Zong et al. | |
| 2011/0286248 A1 | 11/2011 | Wang et al. | |
| 2011/0292699 A1 * | 12/2011 | Goerke | H02M 1/15 363/84 |
| 2012/0025802 A1 | 2/2012 | Carmen | |
| 2012/0075891 A1 | 3/2012 | Zhang et al. | |
| 2012/0243269 A1 | 9/2012 | Ren et al. | |
| 2012/0250378 A1 | 10/2012 | Kok et al. | |
| 2012/0306469 A1 | 12/2012 | Shono | |
| 2013/0051095 A1 * | 2/2013 | Iwata | H02M 1/4225 363/81 |
| 2013/0127432 A1 * | 5/2013 | Chen | H02M 1/4225 323/282 |
| 2013/0162297 A1 * | 6/2013 | Gravati | G01R 19/04 327/58 |
| 2013/0201731 A1 * | 8/2013 | Gu | H02M 1/4225 363/21.17 |
| 2013/0279216 A1 * | 10/2013 | Nguyen | H02M 1/14 363/41 |
| 2013/0294118 A1 | 11/2013 | So et al. | |
| 2013/0308350 A1 | 11/2013 | Huang et al. | |
| 2014/0097821 A1 * | 4/2014 | Chen | G05F 1/468 323/293 |
| 2014/0225532 A1 | 8/2014 | Groeneveld | |
| 2015/0061524 A1 * | 3/2015 | Kunimatsu | H05B 33/0851 315/200 R |

* cited by examiner

SWITCH CONTROL CIRCUIT

CROSS-REFERENCE TO RELATED APPLICATIONS

This application is a division of U.S. patent application Ser. No. 14/446,502 filed on Jul. 30, 2014, and issued as U.S. Pat. No. 9,837,893 on Dec. 5, 2017, which claims priority to and the benefit of U.S. patent application Ser. No. 61/860,488 filed on Jul. 31, 2013, and priority to and the benefit of Korean Patent Application No. 10-2014-0094251, filed with the Korean Intellectual Property Office on Jul. 24, 2014. The contents of the just-mentioned related applications are incorporated herein by reference in their entirety.

BACKGROUND (a) Field

Embodiments of the invention relate to a charge pump and a switch control circuit.

(b) Description of the Related Art

A charge pump supplies power to a control IC, and for this purpose, the charge pump includes a capacitor. In general, when a switch of a power supply device is turned on, energy is stored from an input source of the power supply device to a charge pump. When the switch of the power supply device is turned off, energy that is stored at the charge pump is transferred to a power supply pin of a control IC.

In a general charge pump, because energy proportional to a line input voltage is stored, a power loss occurs according to a peak of the line input voltage. Further, in order to remove a ripple according to a line frequency, there is a problem that a capacitor of the charge pump that is connected to a power supply pin has a large size.

Further, as a ripple of an output current of a power supply device occurs, it is necessary to decrease the ripple of the output current.

Further, in a current mode control of a power factor correction circuit, when detecting an input voltage of the power factor correction circuit and directly using the detected input voltage, a start-up overshoot problem may occur in a high input voltage.

The above information disclosed in this Background section is only for enhancement of understanding of the background of the invention and therefore it may contain information that does not form the prior art that is already known in this country to a person of ordinary skill in the art.

SUMMARY

The invention has been made in an effort to provide a charge pump that can reduce a power loss and a switch control circuit that can reduce a ripple of an output current or that can solve a start-up overshoot problem.

An exemplary embodiment of the invention provides a charge pump including: a first diode coupled to a first node; a second diode coupled to a second node; a pump capacitor coupled to a third node to which the first diode and the second diode are coupled; a power supply capacitor coupled to the pump capacitor; a third diode coupled between the pump capacitor and the power supply capacitor; and a zener diode coupled in parallel to the third diode and the power supply capacitor.

An anode of the first diode may be coupled to the first node, and a cathode of the second diode is coupled to the second node. The pump capacitor may be coupled between the third node and an anode of the third diode.

One electrode of the power supply capacitor may be coupled to a cathode of the third diode, and the other electrode of the power supply capacitor is coupled to the ground.

The zener diode may be coupled between the anode of the third diode and the other electrode of the power supply capacitor.

Another embodiment of the invention provides a charge pump that is coupled to a first node and a second node that are coupled to both ends of a power switch. The charge pump comprising: a first diode configured to be electrically conductive by a voltage of the first node; a second diode configured to be electrically conductive by short-circuit of the first node and the second node; a pump capacitor coupled to a third node to which the first diode and the second diode are coupled; a power supply capacitor coupled to the third node through the pump capacitor; a third diode configured to be biased in a direction from the pump capacitor to the power supply capacitor; and a zener diode coupled in parallel to the power supply capacitor and the third diode.

The first diode may be electrically conductive by the first node voltage, when the power switch is turned off.

The pump capacitor and the power supply capacitor may be charged by a voltage of the first node that is supplied through in the first diode.

The zener diode may be electrically conductive by a power supply voltage that is charged at the power supply capacitor, and the zener diode bypasses the power supply capacitor.

The difference between a voltage of the third node and a power supply voltage that is charged at the power supply capacitor may be charged at the pump capacitor.

The power switch may be turned on and the first node and the second node may be short-circuited, and the second diode may be thus electrically conductive.

The pump capacitor may be discharged through the second diode.

Discharge of the power supply capacitor may be blocked by the third diode, when the pump capacitor is discharged.

Yet another embodiment of the invention provides a switch control circuit that controls a switching operation of a power switch that is coupled to an input voltage. The switch control circuit includes: a ripple reduction circuit configured to generate a ripple reduction signal comprising at least two points having different values and smaller than a waveform of the input voltage at a modulation phase segment based on a peak of the input voltage; and a Pulse-Width Modulation (PWM) comparator configured to compare an error reference voltage corresponding to the ripple reduction signal and a detection voltage corresponding to a current flowing to the power switch.

The switch control circuit may further include a multiplier configured to generate the error reference voltage by multiplying the ripple reduction signal and an error voltage corresponding to the difference between a feedback voltage corresponding to an output and a predetermined output reference voltage.

The ripple reduction circuit may detect a peak of an input voltage waveform that detects the input voltage and generate the ripple reduction signal by modulating the input voltage waveform in the modulation phase segment based on the detected peak.

Yet another embodiment of the invention provides a switch control circuit including: an input voltage detector configured to generate an input voltage waveform by detecting an input voltage that is coupled to a switch; a peak detector configured to detect a peak voltage in the input voltage waveform; and a calculation unit configured to generate an internal reference voltage by dividing the input voltage waveform by the peak voltage and by multiplying a predetermined reference voltage to the divided input voltage waveform. The switch control circuit is configured to control a switching operation of the switch using the internal reference voltage.

The switch control circuit may control a switching operation using a detection voltage corresponding to a current flowing to the switch and an error reference voltage that multiplies the internal reference voltage and an error voltage corresponding to the difference between a feedback voltage corresponding to an output and a predetermined output reference voltage.

A charge pump that can reduce a power loss and a switch control circuit that can reduce a ripple of an output current or that can prevent a start-up overshoot problem through exemplary embodiments are provided.

DETAILED DESCRIPTION OF THE EMBODIMENTS

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 1:
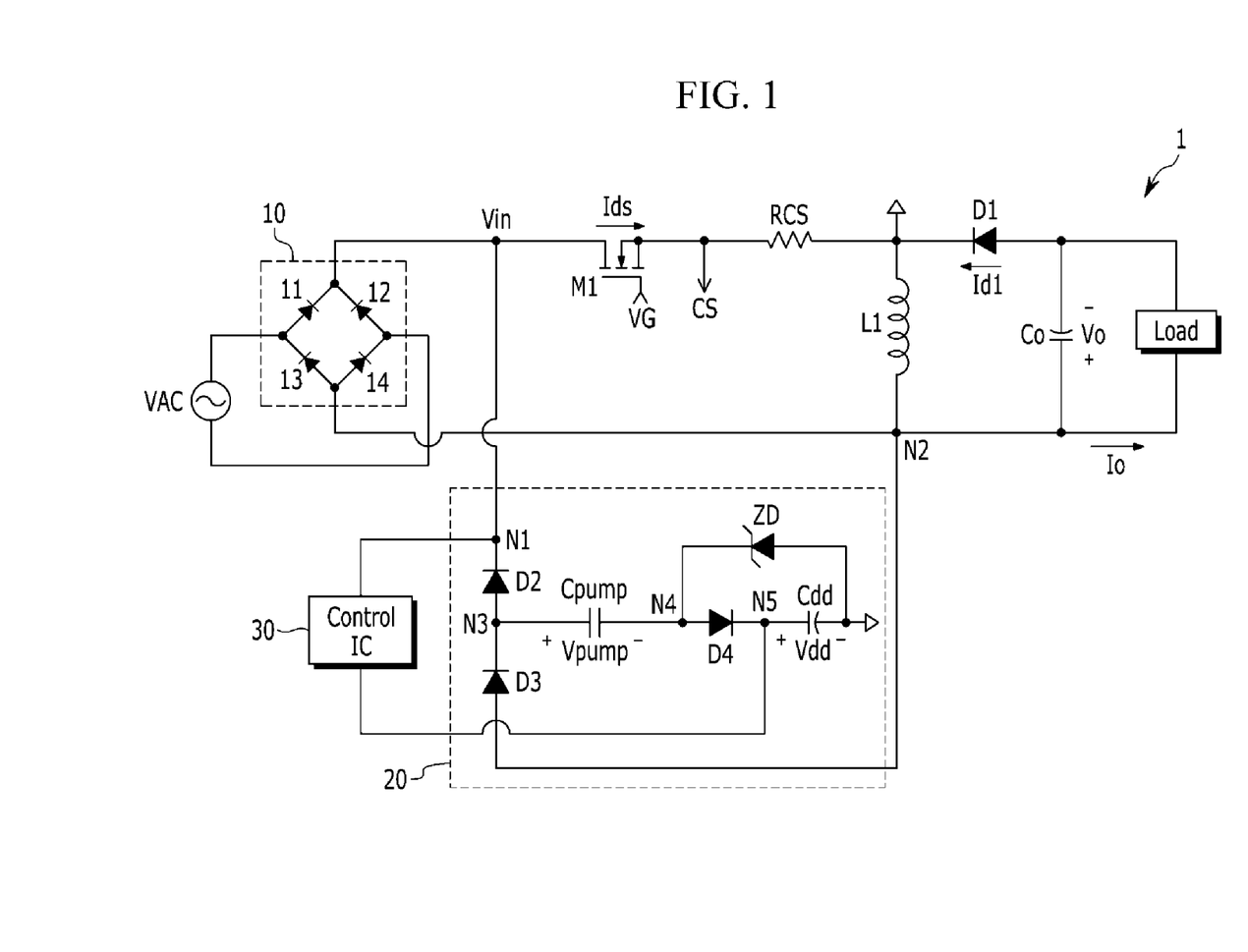
FIG. 1 is a diagram illustrating a charge pump and a power supply device including the charge pump according to an exemplary embodiment of the invention.

FIG. 1 is a diagram illustrating a charge pump and a power supply device including the charge pump according to an exemplary embodiment of the invention.

In FIG. 1, a power supply device 1 is embodied with a boost-buck converter, but the invention is not limited thereto.

An AC input VAC is full wave rectified through a bridge diode 10, and thus a line input voltage is generated. Hereinafter, a line input voltage is referred to as an input voltage Vin. The bridge diode 10 includes four diodes 11-14 and a diode 11 and a diode 14 are together electrically conductive or a diode 12 and a diode 13 are together electrically conductive according to the AC input VAC. The input voltage Vin follows a sine wave in which a full wave is rectified.

A drain of a power switch M1 is connected to the input voltage Vin, and a source of the power switch M1 is connected to one end of an inductor L1. A gate voltage VG is supplied to a gate of the power switch M1, and the power switch M1 is switched according to the gate voltage VG.

A resistor RCS for detecting a switch current Ids is connected between the power switch M1 and the inductor L1. One electrode of the output capacitor Co is connected to the other end of the inductor L1, and the other electrode of the output capacitor Co is connected to an anode of a diode D1. A cathode of the diode D1 and one end of the inductor L1 are connected to the ground. The output capacitor Co reduces a ripple of an output voltage Vo and an output current Io.

A load is connected to the output voltage Vo and the output current Io flows to the load.

When the power switch M1 is turned on, a current flows to the inductor L1 and energy is stored at the inductor L1. For an off period of the power switch M1, the diode D1 is electrically conductive. When the diode D1 is electrically conductive, a current of the inductor L1 by energy that is stored at the inductor L1 charges the output capacitor Co or is supplied to the load, and a current Id1 flows through the diode D1.

A charge pump 20 includes a pump capacitor Cpump, a power supply capacitor Cdd, three diodes D2, D3, and D4, and a zener diode ZD.

The diode D2 and the diode D3 are connected in series between the node N1 and the node N2. A cathode of the diode D2 is connected to a node N1, and an anode of the diode D3 is connected to a node N2, and an anode of the diode D2 and a cathode of the diode D3 are connected to a node N3.

The pump capacitor Cpump, the diode D4, and the power supply capacitor Cdd are connected in series between the node N3 and the ground. One electrode of the pump capacitor Cpump is connected to the node N3, and the other electrode of the pump capacitor Cpump and an anode of the diode D4 are connected to the node N4, and a cathode of the diode D4 and one electrode of the power supply capacitor Cdd are connected to a node N5. The diode D4 is biased and electrically conductive in a direction from the pump capacitor Cpump to the power supply capacitor Cdd.

The other electrode of the power supply capacitor Cdd is connected to the ground, and the zener diode ZD is connected between the node N4 and the ground. A cathode of the zener diode ZD is connected to the node N4, an anode of the zener diode ZD is connected to the ground, and the zener diode ZD is connected in parallel to the diode D4 and the power supply capacitor Cdd. Hereinafter, a voltage that is stored at the power supply capacitor Cdd is referred to as a power supply voltage Vdd.

The pump capacitor Cpump and the power supply capacitor Cdd are charged by a voltage that is supplied through the diode D3. For example, when the power switch M1 is turned off, the node N1 is connected to the input voltage Vin, and the node N2 becomes the output voltage Vo. The diode D2 is reversely biased, and the diode D3 is electrically conductive. Accordingly, the pump capacitor Cpump and the power supply capacitor Cdd are charged by the output voltage Vo.

As the power supply capacitor Cdd is charged by the output voltage Vo, when a voltage of the node N4 rises to a zener voltage of the zener diode ZD, the zener diode ZD is electrically conductive to bypass the power supply capacitor Cdd. Accordingly, the power supply capacitor Cdd is no longer charged, and the power supply voltage Vdd is maintained. The power supply voltage Vdd is maintained in a constant level by the zener diode ZD to prevent power consumption from occurring by unnecessary charge.

A zener voltage is set to a voltage in which a predetermined margin is added to a level of the power supply voltage Vdd necessary for operating a control IC 30 and the power supply voltage Vdd of the power supply capacitor Cdd enables the control IC 30 to operate.

The charge path is bypassed to the zener diode ZD during the diode D3 is electrically conductive, and only the pump capacitor Cpump is charged. The difference between a voltage of the node N3 and the power supply voltage Vdd is stored at the pump capacitor Cpump. When a voltage of the node N3 arrives at the output voltage Vo by charge of the pump capacitor Cpump, the diode D3 is blocked. In this case, a voltage Vpump of the pump capacitor Cpump is Vo-Vdd.

Thereafter, when the diode D2 is electrically conductive by a voltage of the node N1, the pump capacitor Cpump is discharged through the diode D2.

For example, when the power switch M1 is turned on, the node N1 and the node N2 are electrically connected to the ground to be short-circuited. Because a voltage of the node N3 is higher than a ground voltage, the diode D2 is electrically conductive, and the diode D3 is reversely biased. In this case, the pump capacitor Cpump is discharged for a period in which the diode D2 is electrically conductive.

In this case, discharge of the power supply capacitor Cdd is blocked by the diode D4, and the power supply voltage Vdd is constantly maintained.

The control IC 30 receives the power supply voltage Vdd and operates by using the power supply voltage Vdd. A power supply pin (not shown) of the control IC 30 is connected to the node N5 to receive the power supply voltage Vdd from the power supply capacitor Cdd. The control IC 30 is connected to the node N1, receives a detection voltage CS occurring in the resistor RCS, and generates the gate voltage VG for controlling a switching operation of the power switch M1.

In this way, the power supply voltage Vdd of the power supply capacitor Cdd is maintained to a rated power supply voltage Vdd by the zener diode ZD, and the difference between the output voltage Vo and the rated power supply voltage Vdd is charged at the pump capacitor Cpump, and thus a charge operation unnecessary for the power supply capacitor Cdd does not occur.

That is, charge of the power supply capacitor Cdd is started by energy from the inductor L1 from a turn-off time point of the power switch M1, and when a voltage of the pump capacitor Cpump arrives at Vo-Vdd, energy transfer from the inductor L1 is stopped. When the power switch M1 is turned on, the pump capacitor Cpump is discharged.

In a conventional charge pump, even when a voltage that is charged at the capacitor is enough to supply power to the control IC, a current is supplied to the capacitor, and thus there is a problem that unnecessary power consumption occurs. However, according to the present exemplary embodiment, when a voltage that is charged at each of the pump capacitor Cpump and the power supply capacitor Cdd arrives at a predetermined level, charge does not occur, and thus power consumption can be decreased.

In the foregoing exemplary embodiment, a power supply device that is embodied with a boost-buck converter is described, but the invention is not limited thereto. An exemplary embodiment of a power supply device that is embodied with a flyback type will be described.

Figure 2:
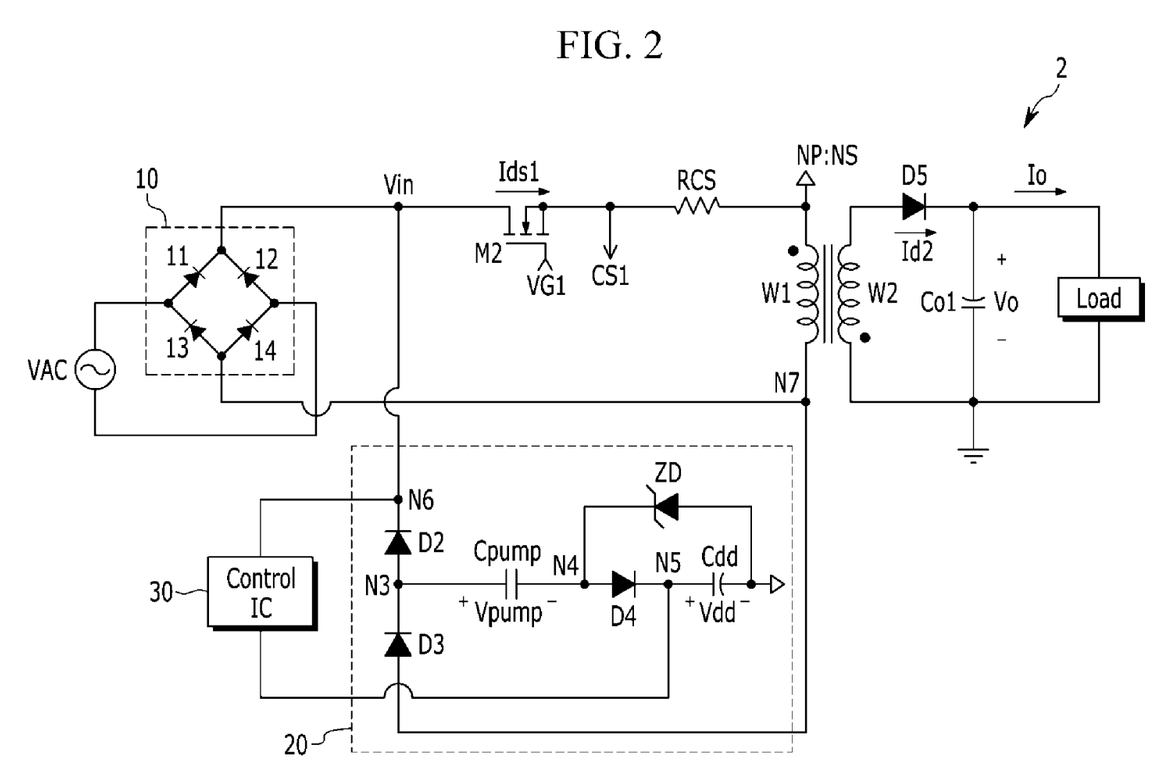
FIG. 2 is a diagram illustrating a power supply device according to another exemplary embodiment of the invention.

FIG. 2 is a diagram illustrating a power supply device according to another exemplary embodiment of the invention.

In FIG. 2, constituent elements identical to or corresponding to those according to the exemplary embodiment of FIG. 1 are denoted by the same reference numerals and marks, and therefore a detailed description thereof will be omitted. The power supply device of FIG. 2 is embodied with a flyback type.

A drain of a power switch M2 is connected to an input voltage Vin, a source of the power switch M2 is connected to a primary wire W1, and a gate voltage VG1 is supplied to a gate of the power switch M2. The power switch M2 is switched according to the gate voltage VG1.

A resistor RCS is connected between the power switch M2 and the primary wire W1, and when a switch current Ids1 is flowed to the resistor RCS, a detection voltage CS1 occurs.

The primary wire W1 and a secondary wire W2 are insulation coupled, and a voltage and current of the secondary wire W2 are adjusted according to a winding ratio NS/NP between the wiring number NP of the primary wire W1 and the wiring number NS of the secondary wire W2.

An anode of a diode D5 is connected to one end of the secondary wire W2, and the other end of the secondary wire W2 is connected to the secondary side ground. An output capacitor Co1 is connected between a cathode of the diode D5 and the secondary side ground. A load is connected to an output voltage Vo, and an output current Io is supplied.

When the power switch M2 is turned on, a current flows to the primary wire W1 and energy is thus stored at the primary wire W1. When the power switch M2 is turned off, the diode D5 is electrically conductive and thus a current flowing to the secondary wire W2 flows to the diode D5. A current Id2 flowing through the diode D5 charges the output capacitor Co1 or is supplied as the output current Io to the load.

The charge pump 20 of the exemplary embodiment of FIG. 1 operates with the same method even in another exemplary embodiment.

In FIG. 2, a node N6 and a node N7 are connected to a drain of the power switch M2 and the other end of the primary wire W1, respectively, instead of the node N1 and the node N2 of FIG. 1, and the diode D2 and the diode D3 are connected in series between the node N6 and the node N7. Other connection relationship and nodes are the same as those of FIG. 1.

For example, when the power switch M2 is turned off, the node N6 is connected to the input voltage Vin, and the node N7 has a voltage in which a winding ratio NP/NS is multiplied to a both end voltage of the second wire W2. The both end voltage of the second wire W2 is a voltage in which a forward voltage VF of the diode D5 is added to the output voltage Vo, and the forward voltage VF is much lower than the output voltage Vo. A voltage of the node N7 is substantially a voltage in which NP/NS is multiplied to the output voltage Vo. For convenience of description, when a winding ratio is 1, a voltage of the node N7 is an output voltage Vo.

Therefore, the diode D2 is reversely biased, and the diode D3 is electrically connected. Therefore, a pump capacitor Cpump and a power supply capacitor Cdd are charged by the output voltage Vo.

As the power supply capacitor Cdd is charged by the output voltage Vo, when a voltage of a node N4 rises to a zener voltage of the zener diode ZD, the zener diode ZD is electrically conductive to bypass the power supply capacitor Cdd. Therefore, the power supply capacitor Cdd is no longer charged, and a power supply voltage Vdd is maintained. The power supply voltage Vdd is maintained in a constant level by the zener diode ZD to prevent power consumption from occurring by unnecessary charge.

While the diode D3 is electrically conductive, the charge path is bypassed to the zener diode ZD and thus only the pump capacitor Cpump is charged, and the difference between a voltage of the node N3 and the power supply voltage Vdd is stored at the pump capacitor Cpump. When a voltage of the node N3 arrives at the output voltage Vo by charge of the pump capacitor Cpump, the diode D3 is blocked. In this case, a voltage Vpump of the pump capacitor Cpump is Vo-Vdd.

Thereafter, when the diode D2 is electrically conductive by a voltage of the node N6, the pump capacitor Cpump is discharged through the diode D2.

For example, when the power switch M2 is turned on, the node N6 and the node N7 are electrically connected to the primary side ground to be short-circuited. Because a voltage of the node N3 is higher than a ground voltage, the diode D2 is electrically connected, and the diode D3 is reversely biased. In this case, the pump capacitor Cpump is discharged for a period in which the diode D2 is electrically connected.

In this case, discharge of the power supply capacitor Cdd by the diode D4 is blocked, and the power supply voltage Vdd is constantly maintained.

A control IC 40 receives and operates the power supply voltage Vdd. A power supply pin (not shown) of the control IC 40 is connected to the node N5 to receive the power supply voltage Vdd from the power supply capacitor Cdd. The control IC 40 is connected to the node N6, receives a detection voltage CS1 occurring in a resistor RCS, and generates a gate voltage VG1 for controlling a switching operation of the power switch M2.

In this way, even in another exemplary embodiment, a power supply voltage Vdd of a power supply capacitor Cdd is maintained into a rated power supply voltage Vdd by a zener diode ZD, and the difference between an output voltage Vo and the rated power supply voltage Vdd is charged in a pump capacitor Cpump, and a charge operation unnecessary for the power supply capacitor Cdd does not occur.

That is, when charge of the power supply capacitor Cdd is started by energy of a primary wire from a turn-off time point of the power switch M2, and when a voltage of the pump capacitor Cpump arrives at Vo-Vdd, energy transfer from a primary wire is stopped. When the power switch M2 is turned on, the pump capacitor Cpump is discharged.

In this way, because a charge pump according to the exemplary embodiment does not use a line input voltage, a power loss according to a peak of the line input voltage does not occur, and in order to remove a ripple according to a line frequency, it is unnecessary that a capacitor of the charge pump has a large size.

Hereinafter, a power supply device according to another exemplary embodiment will be described.

Figure 3:
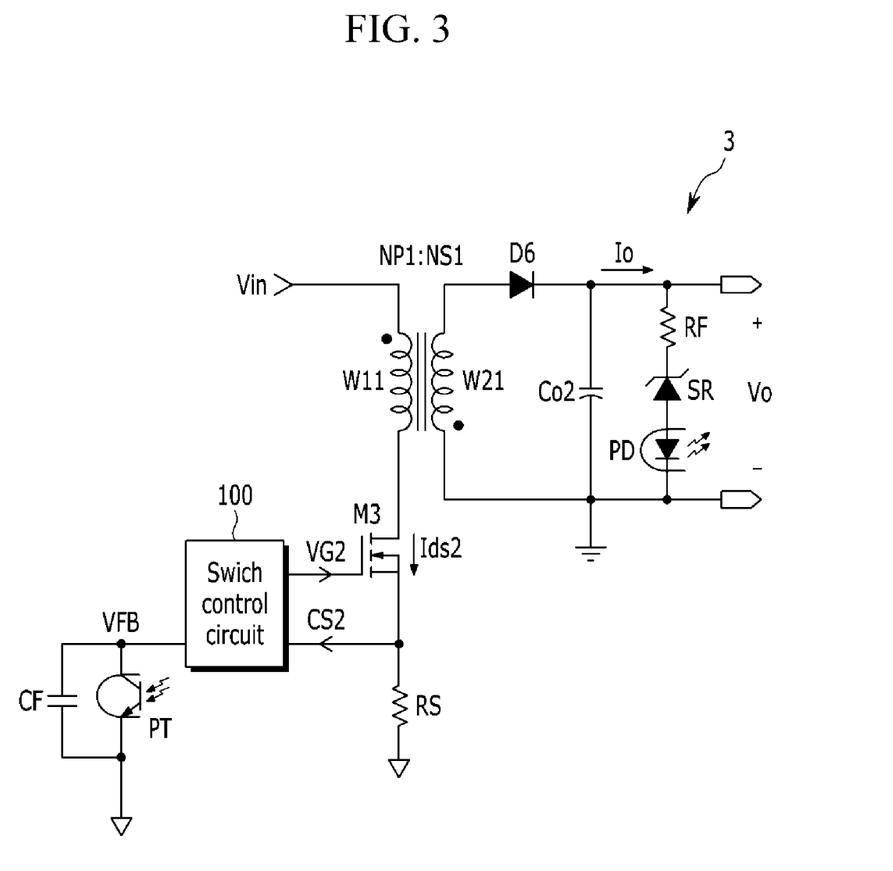
FIG. 3 is a diagram illustrating a power supply device according to another exemplary embodiment of the invention.

FIG. 3 is a diagram illustrating a power supply device according to another exemplary embodiment of the invention.

A power supply device of FIG. 3 is illustrated in a flyback type, but the invention is not limited thereto.

A switch control circuit 100 of the power supply device 3 of FIG. 3 detects an input voltage Vin, and in order to decrease a ripple of an output current, the switch control circuit 100 generates a ripple reduction signal.

In the power supply device 3 of FIG. 3, a primary wire W11 includes one end that is connected to the input voltage Vin and the other end that is connected to a drain of a power switch M3. A source of the power switch M3 is connected to a primary side ground through a resistor RS. A detection voltage CS2 occurring in the resistor RS is a voltage for detecting a switch current Ids2 of the power switch M3. The power switch M3 performs a switching operation according to a gate voltage VG2.

The primary wire W11 and a secondary wire W21 are insulation coupled with a predetermined winding ratio NS1/NP1. One end of the secondary wire W21 is connected to an anode of a diode D6, and the other end of the secondary wire W21 is connected to the secondary side ground. A cathode of the diode D6 is connected to one electrode of an output capacitor Co2.

When the power switch M3 is turned on, a current flows to the primary wire W11 and thus energy is stored at the primary wire W11. When the power switch M3 is turned off, the diode D6 is electrically conductive and a current flowing to the secondary wire W21 thus flows to the diode D6. A current flowing through the diode D6 charges the output capacitor Co2 or becomes an output current Io.

In order to transfer information about an output voltage Vo to the primary side, in FIG. 3, an opto-coupler is shown, but the invention is not limited thereto. The opto-coupler includes a photodiode PD and a phototransistor PT. The photodiode PD is coupled to an output voltage Vo with a resistor RF and a shunt regulator SR in series.

The shunt regulator SR is biased by the output voltage Vo and enables a current according to the output voltage Vo to flow. As a current flows to the photodiode PD, the photodiode PD emits light. The phototransistor PT enables a current corresponding to a light emitting quantity of the photodiode PD to flow, and a feedback voltage VFB is controlled according to a current flowing to the phototransistor PT. A capacitor CF is connected in parallel to the phototransistor PT. For example, when the output voltage Vo increases, a current flowing to the phototransistor PT increases, and the feedback voltage VFB may thus decrease, and when the output voltage Vo decreases, a current flowing to the phototransistor PT decreases and the feedback voltage VFB may thus increase.

It is described that the switch control circuit 100 receives an input of the feedback voltage VFB corresponding to the output voltage Vo, but the invention is not limited thereto. The switch control circuit may receive an input of the feedback voltage VFB corresponding to the output current Io instead of the output voltage Vo.

Hereinafter, the switch control circuit 100 will be described with reference to FIG. 4.

Figure 4:
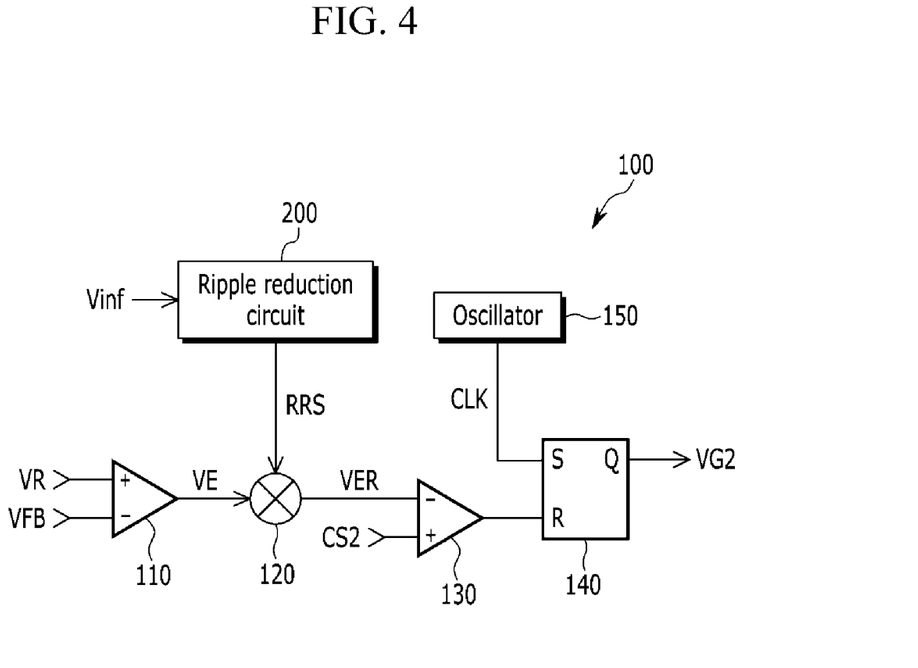
FIG. 4 is a diagram illustrating a switch control circuit according to another exemplary embodiment of the invention.

FIG. 4 is a diagram illustrating a switch control circuit according to another exemplary embodiment of the invention.

The switch control circuit 100 includes an error amplifier 110, a multiplier 120, a Pulse-Width Modulation (PWM) comparator 130, an SR latch 140, an oscillator 150, and a ripple reduction circuit 200.

The error amplifier 110 amplifies the difference between an output reference voltage VR and a feedback voltage VFB to generate an error voltage VE. For example, a feedback voltage VFB is input to an inverting terminal (−) of the error amplifier 110 and an output reference voltage VR is input to a non-inverting terminal (+) thereof, and the error amplifier 110 amplifies a voltage that subtracts an input of the inverting terminal (−) from an input of the non-inverting terminal (+) by a predetermined gain, thereby generating an error voltage VE.

The multiplier 120 multiplies the error voltage VE and a ripple reduction signal RRS, thereby generating an error reference voltage VER.

The PWM comparator 130 outputs a comparison result of a detection voltage CS2 and the error reference voltage VER. For example, the detection voltage CS2 is input to a non-inverting terminal (+) of the PWM comparator 130, and the error reference voltage VER is input to an inverting terminal (−) thereof. When an input of the non-inverting terminal (+) is equal to or greater than an input of the inverting terminal (−), the PWM comparator 130 outputs a high level, and when an input of the non-inverting terminal (+) is less than an input of the inverting terminal (−), the PWM comparator 130 outputs a low level.

The SR latch 140 outputs a gate voltage VG2 of an enable level through an output terminal Q according to an input of a set terminal S and outputs a gate voltage VG2 of a disable level through an output terminal Q according to an input of a reset terminal R. A clock signal CLK is input to the set terminal S of the SR latch 140, and an output of the PWM comparator 130 is input to a reset terminal R thereof.

For example, when a rising edge is input to the set terminal S, the SR latch 140 outputs a gate voltage VG2 of a high level, and when a rising edge is input to the reset terminal R, the SR latch 140 outputs a gate voltage VG2 of a low level.

The oscillator 150 generates and outputs a clock signal CLK that determines a switching frequency of the power switch M3.

The ripple reduction circuit 200 receives an input voltage information Vinf, detects a peak of an input voltage Vin, and generates a ripple reduction signal RRS based on the detected peak. In this case, the ripple reduction signal RRS follows an input voltage Vin, but includes a modulation waveform for ripple reduction at a predetermined phase segment (hereinafter, a modulation phase segment) based on a peak.

The input voltage information Vinf is a signal according to the input voltage Vin, may be a voltage in which resistors are distributed to the input voltage Vin, and may be a voltage for the input voltage Vin that is acquired through an auxiliary wire (not shown) that is coupled to the primary wire W11. That is, a method of acquiring input voltage information Vinf is not limited to a specific method.

Figure 5:
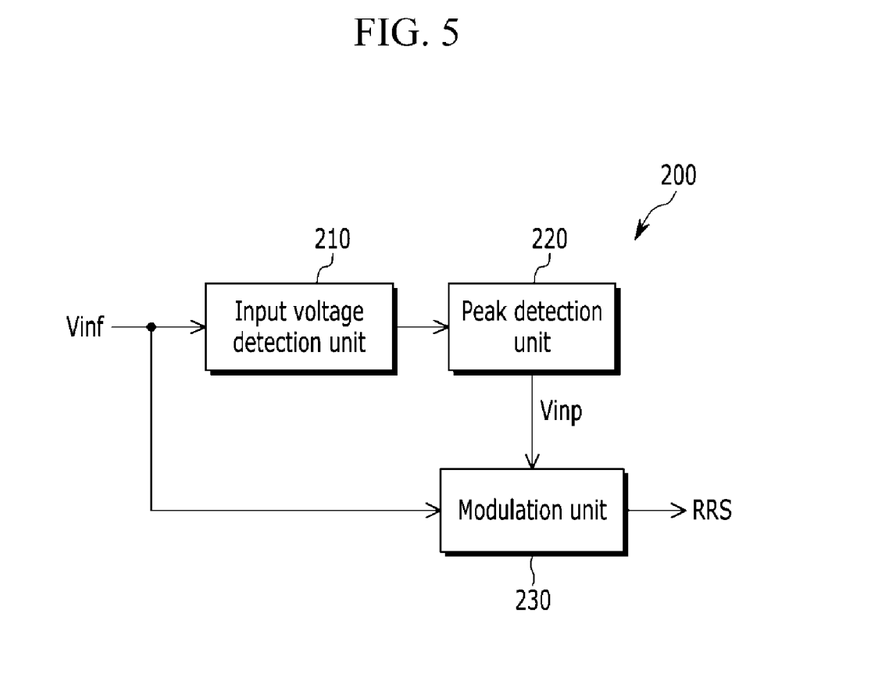
FIG. 5 is a diagram illustrating a ripple reduction circuit according to another exemplary embodiment of the invention.

FIG. 5 is a diagram illustrating a ripple reduction circuit according to another exemplary embodiment of the invention.

As shown in FIG. 5, the ripple reduction circuit 200 includes an input voltage detection unit 210, a peak detection unit 220, and a modulation unit 230.

The input voltage detection unit 210 may sample and hold an input voltage Vin with a predetermined cycle based on the input voltage information Vinf, detect a waveform of the input voltage Vin, and generate an input voltage waveform Vins. Alternatively, the input voltage detection unit 210 may detect a zero crossing time point of the input voltage Vin using the input voltage information Vinf and generate a full wave rectification sine wave having a period between the detected zero crossing time point as one cycle into an input voltage waveform Vins.

The input voltage detection unit 210 transfers the input voltage waveform Vins to the with the peak detection unit 220.

The peak detection unit 220 detects a peak of the input voltage Vin based on the input voltage waveform Vins. For example, the peak detection unit 220 may sample and hold an input voltage waveform Vins with a constant cycle and detect an input voltage peak Vinp with a method of comparing an input voltage with an immediately preceding hold voltage. Alternatively, the peak detection unit 220 may regard an intermediate point of a detected zero crossing time point as a peak point, detect a voltage of an input voltage waveform Vins at the peak point, and generate an input voltage peak Vinp.

The input voltage peak Vinp may be a signal representing a phase and magnitude of a peak in an input voltage Vin of one cycle unit.

The modulation unit 230 receives an input of input voltage information Vinf and an input voltage peak Vinp, and generates a ripple reduction signal RRS that follows an input voltage Vin and is modulated at a modulation phase segment based on a peak to reduce a ripple of the output current Io.

The input voltage Vin may be a sine wave in which a full wave is rectified, and waveforms of the input voltage Vin in an adjacent cycle are similar. An input voltage peak Vinp that is detected in the peak detection unit 220 may be a signal representing a phase and magnitude of a peak in an immediately preceding cycle, but the difference between a peak of an input voltage Vin of a present cycle and a peak of the input voltage Vin of an immediately preceding cycle may be disregarded. Therefore, a peak of an input voltage Vin of a present cycle may be estimated based on an input voltage peak Vinp of an immediately preceding cycle, and a ripple reduction signal RRS that is modulated at a modulation phase segment based on the estimated peak may be generated.

Hereinafter, a ripple reduction signal RRS that is generated in the modulation unit 230 will be described.

Figure 6A:
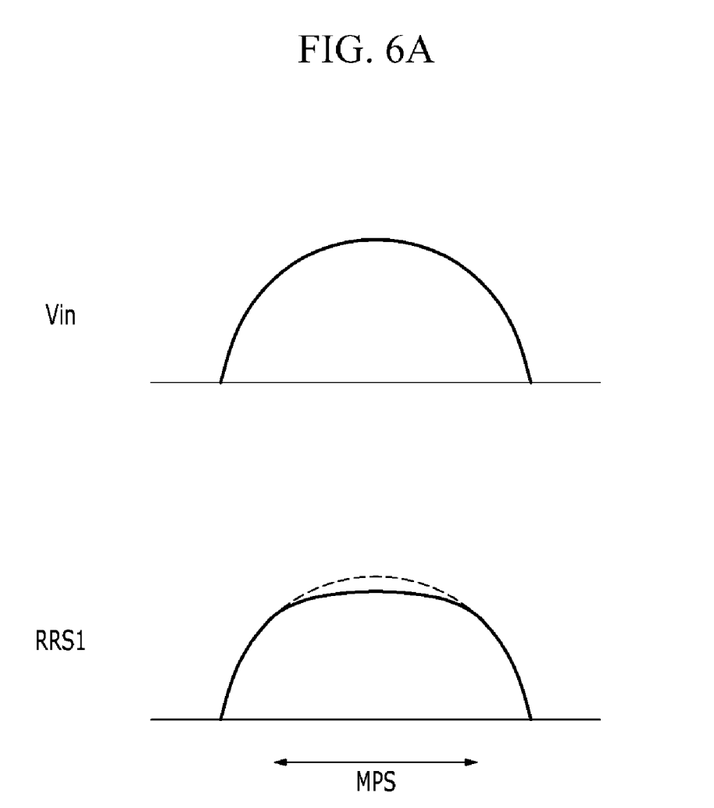
FIGS. 6A-6C are waveform diagrams illustrating an input voltage and a ripple reduction signal.
Figure 6B:
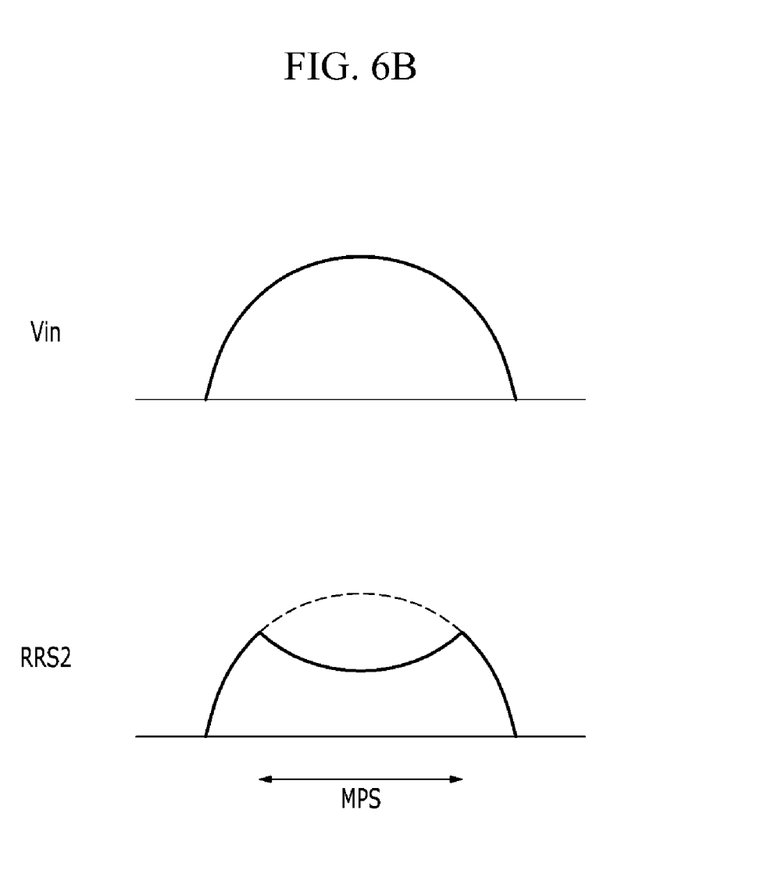
Figure 6C:
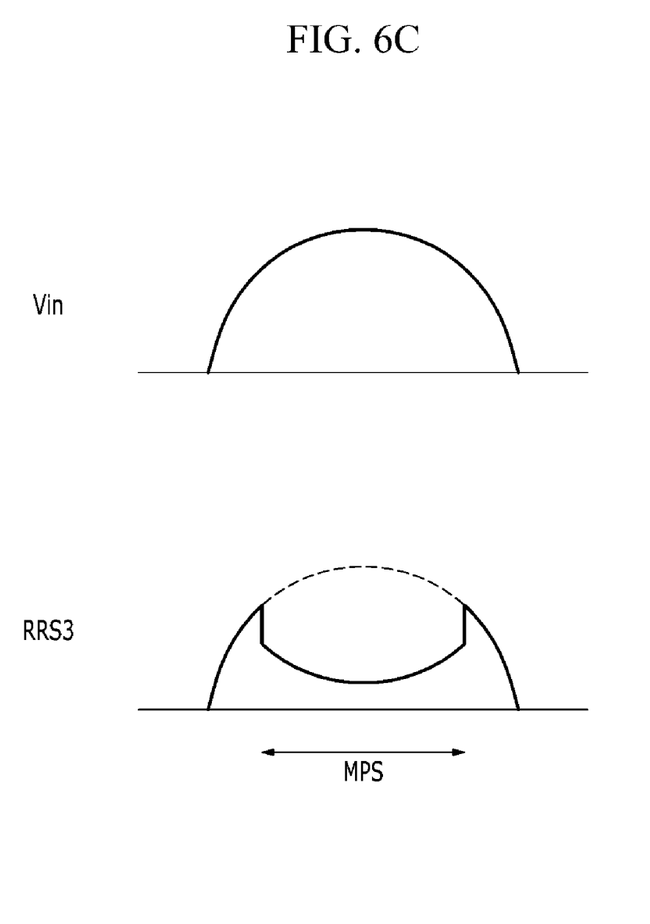

FIGS. 6A-6C are waveform diagrams illustrating an input voltage and a ripple reduction signal.

As shown in FIG. 6A, a ripple reduction signal RRS1 may generate a waveform of a level relativity lower than that of a sine wave of an input voltage Vin at a modulation phase segment MPI based on a peak.

Alternatively, as shown in FIG. 6B, a ripple reduction signal RRS2 may generate a waveform convex downward at a modulation phase segment MPS based on a peak.

Alternatively, as shown in FIG. 6C, a ripple reduction signal RRS3 may decrease at a start time point of a modulation phase segment MPS based on a peak, increase at an end time point, and generate a waveform convex downward at a modulation phase segment MPS.

As shown in FIGS. 6A-6C, the ripple reduction signals RRS1-3 are waveforms representing various exemplary embodiments at a modulation phase segment based on a peak of the input voltage Vin, and the invention is not limited thereto. The ripple reduction signal may generate a waveform including at least two points having different values and smaller than that of a waveform of an input voltage at a modulation phase segment.

When an error reference voltage VER decreases at a modulation phase segment MPS, an on period of the power switch M3 decreases, and the output current Io thus decreases and thus a ripple of the output current Io decreases.

Hereinafter, a process in which a switch control circuit according to another exemplary embodiment generates an internal reference waveform having a constant peak regardless of an input voltage will be described.

Figure 7:
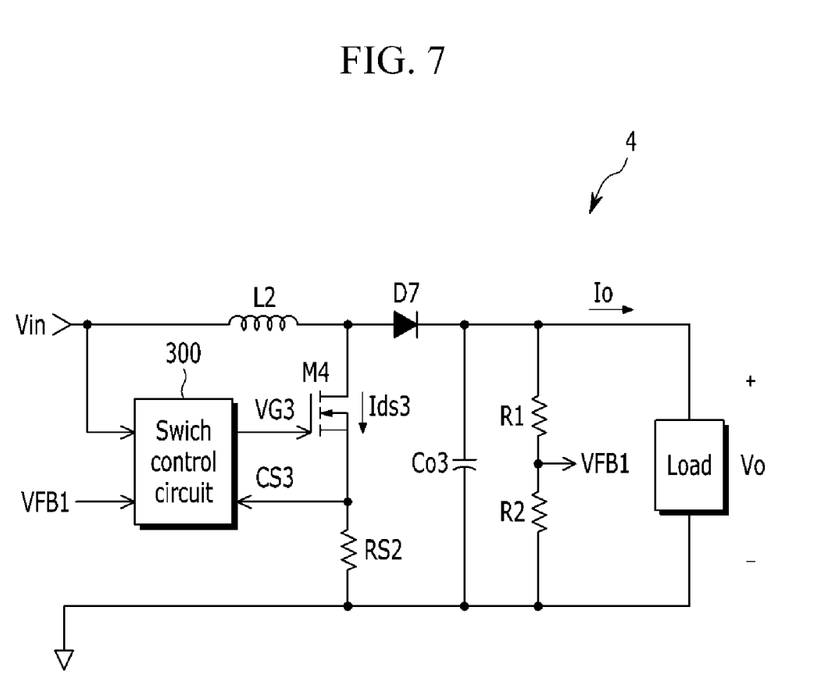
FIG. 7 is a diagram illustrating a power factor compensation circuit according to another exemplary embodiment of the invention.

FIG. 7 is a diagram illustrating a power factor compensation circuit according to another exemplary embodiment of the invention.

A power factor correction circuit 4 of FIG. 7 is embodied with a booster converter, but the invention is not limited thereto.

For a turn-on period of a switch M4, a current flows to an inductor L2 and energy is stored at the inductor L2. For a turn-off period of the switch M4, a diode D7 is electrically conductive and a current thus flows, and an output current Io by energy that is stored at the inductor L2 is supplied to a load. A capacitor Co3 may be charged by a current flowing through the diode D7. An output voltage Vo is distributed by a resistor R1 and a resistor R2 to be a feedback voltage VFB1, and the feedback voltage VFB1 is input to a switch control circuit 300.

The switch control circuit 300 is connected to an input voltage Vin to detect the input voltage, detects a peak voltage in every cycle of the input voltage, divides the detected input voltage by the detected peak voltage, and multiplies a predetermined reference voltage to the result, thereby generating an internal reference voltage.

Further, a resistor RS2 is connected to a source of the switch M4, and for a turn-on period of the switch M4, a detection voltage CS3 occurs according to a switch current Ids3 flowing through the resistor RS2. The detection voltage CS3 is input to the switch control circuit 300.

The switch control circuit 300 compares a voltage that multiplies an internal reference voltage and an error voltage with a detection voltage and controls a switching operation of the switch M4.

Hereinafter, a switch control circuit according to another exemplary embodiment of the invention will be described with reference to FIG. 8.

Figure 8:
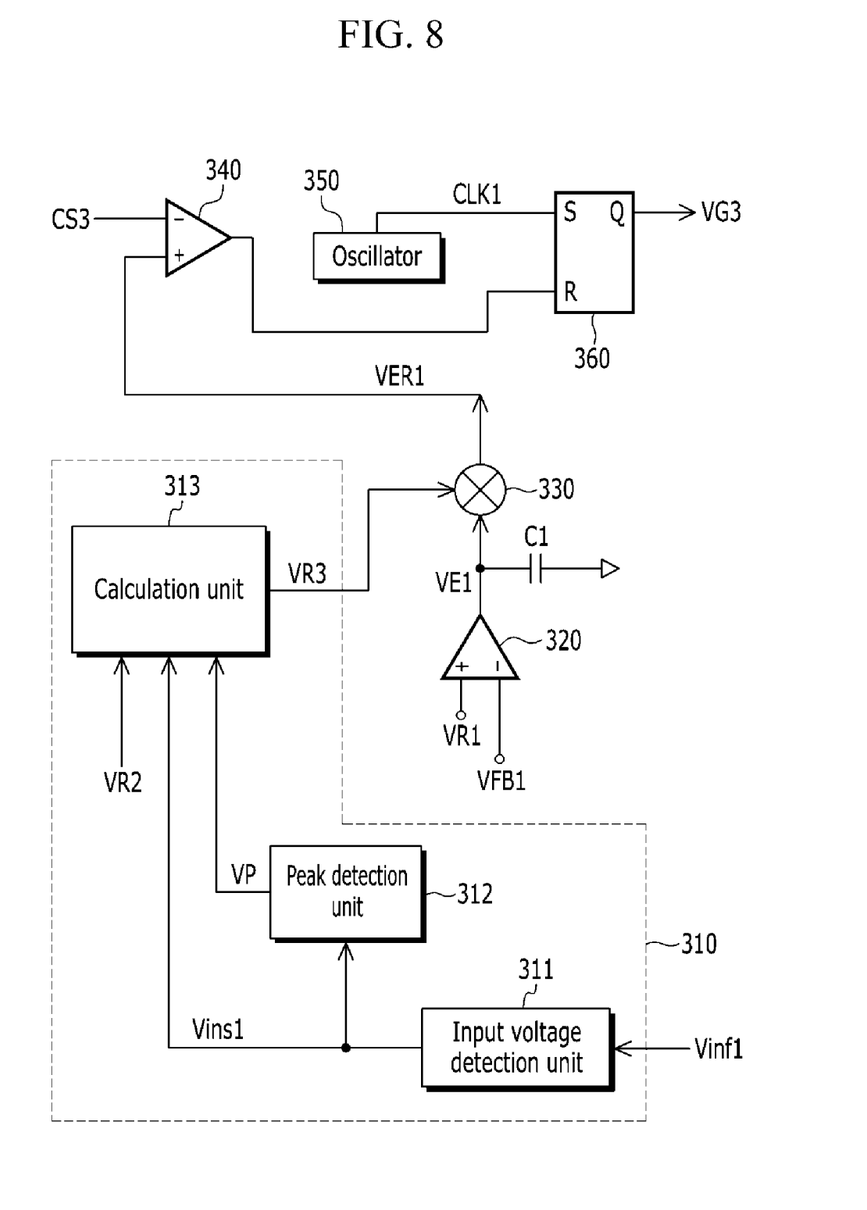
FIG. 8 is a diagram illustrating a switch control circuit according to another exemplary embodiment of the invention.

FIG. 8 is a diagram illustrating a switch control circuit according to another exemplary embodiment of the invention.

A switch control circuit 300 includes an internal reference voltage generator 310, an error amplifier 320, a multiplier 330, a PWM comparator 340, an oscillator 350, and an SR latch 360.

The error amplifier 320 amplifies the difference between an output reference voltage VR1 and a feedback voltage VFB1 to generate an error voltage VE1. For example, the feedback voltage VFB1 is input to an inverting terminal (−) of the error amplifier 320, and the output reference voltage VR1 is input to a non-inverting terminal (+) thereof, and the error amplifier 320 amplifies a voltage that subtracts an input of the inverting terminal (−) from an input of the non-inverting terminal (+) by a predetermined gain, thereby generating an error voltage VE1. A capacitor C1 may be connected to an output terminal of the error amplifier 320.

The multiplier 330 multiplies the error voltage VE1 and an internal reference voltage VR3, thereby generating an error reference voltage VER1.

The PWM comparator 340 outputs a comparison result of a detection voltage CS3 and the error reference voltage VER1. For example, a detection voltage CS3 is input to a non-inverting terminal (+) of the PWM comparator 340, and an error reference voltage VER1 is input to an inverting terminal (−) thereof. When an input of the non-inverting terminal (+) is equal to or greater than an input of the inverting terminal (−), the PWM comparator 340 outputs a high level, and when an input of the non-inverting terminal (+) is less than an input of the inverting terminal (−), the PWM comparator 340 outputs a low level.

The SR latch 360 outputs a gate voltage VG3 of an enable level through an output terminal Q according to an input of a set terminal S and outputs a gate voltage VG3 of a disable level through an output terminal Q according to an input of a reset terminal R. In the SR latch 360, a clock signal CLK1 is input to the set terminal S, and an output of the PWM comparator 340 is input to a reset terminal R.

For example, when a rising edge is input to the set terminal S, the SR latch 360 may output a gate voltage VG3 of a high level, and when a rising edge is input to the reset terminal R, the SR latch 360 may output a gate voltage VG3 of a low level.

The oscillator 350 generates and outputs a clock signal CLK1 that determines a switching frequency of a switch M4.

The internal reference voltage generator 310 receives an input of input voltage information Vinf to detect a peak voltage Vinp1 of an input voltage Vin, divides an input voltage waveform Vins that is detected by the input voltage information Vinf by the detected peak voltage Vinp1, and multiplies a predetermined reference voltage VR2 to the divided result, thereby generating an internal reference voltage VR3.

The input voltage information Vinf1 is a signal according to an input voltage Vin and may be a voltage in which resistors are distributed to the input voltage Vin. When the power factor correction circuit of FIG. 7 includes an auxiliary inductor (not shown) that is coupled to an inductor L2, the input voltage information Vinf1 may be a voltage for the input voltage Vin that is acquired through the auxiliary inductor. That is, a method of acquiring input voltage information Vinf1 is not limited to a specific method.

The internal reference voltage generator 310 includes an input voltage detection unit 311, a peak detection unit 312, and a calculation unit 313.

The input voltage detection unit 311 has the same configuration as that of the input voltage detection unit 210 of FIG. 5 and generates an input voltage waveform Vins1 based on the input voltage information Vinf1.

The peak detection unit 312 detects a peak voltage VP of an input voltage Vin based on the input voltage waveform Vins1. Various methods in which the peak detection unit 312 detects a peak voltage VP may exist. The peak detection unit 312 may sample and hold an input voltage waveform Vins1 with a predetermined cycle and detect a peak voltage VP with a method of comparing with an immediately preceding hold voltage. Alternatively, the peak detection unit 312 may regard an intermediate point of a detected zero crossing time point as a peak point and detect a voltage of the input voltage waveform Vins as a peak voltage VP at the peak point.

The calculation unit 313 receives an input of an input voltage waveform Vins and a peak voltage VP, divides the input voltage waveform Vins by the peak voltage VP, and multiplies a reference voltage VR2 to the result, thereby generating an internal reference voltage VR3.

The input voltage Vin may be a sine wave in which a full wave is rectified, and waveforms of an input voltage Vin in an adjacent cycle are similar. The peak voltage VP that is detected in the peak detection unit 312 may be a signal representing a phase and magnitude of a peak in an immediately preceding cycle, but the difference between a peak of an input voltage Vin of a present cycle and a peak of an input voltage Vin of an immediately preceding cycle may be disregarded. Therefore, the calculation unit 313 divides an input voltage waveform Vins of a present cycle by the peak voltage VP of an immediately preceding cycle, thereby generating an internal reference voltage VR3.

A peak of the internal reference voltage VR3 is constantly controlled.

In power factor correction, for a current mode control, an input voltage is detected. Information about a peak voltage may be acquired from an input voltage that is detected in this way. In another exemplary embodiment, an internal reference voltage having a constant peak and following a waveform of an input voltage is generated using information about a peak voltage and the input voltage. Therefore, a start-up overshoot problem occurring when an input voltage is high or fluctuates can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 1-4: power supply device
20: charge pump
30, 40: control IC
Cpump: pump capacitor
Cdd: power supply capacitor
D1-D6, 11-14: diode
100, 300: switch control circuit
200: ripple reduction circuit

What is claimed is:

1. A switch control circuit that controls a switching operation of a power switch that is coupled to an input voltage, the switch control circuit comprising:
a ripple reduction circuit configured to generate a ripple reduction signal comprising at least two points having different values based on a waveform of the input voltage at a modulation phase segment based on a peak of the input voltage; and
a Pulse-Width Modulation (PWM) comparator configured to compare an error reference voltage corresponding to the ripple reduction signal and a detection voltage corresponding to a current flowing to the power switch,
wherein the ripple reduction circuit is configured to detect a magnitude corresponding to a peak voltage of an input voltage waveform and to generate the ripple reduction signal by modulating the input voltage waveform in the modulation phase segment based on the magnitude corresponding to the peak voltage.

2. The switch control circuit of claim 1, further comprising a multiplier configured to generate the error reference voltage by multiplying the ripple reduction signal and an error voltage corresponding to the difference between a feedback voltage corresponding to an output and a predetermined output reference voltage.

3. The switch control circuit of claim 1, wherein a waveform of the ripple reduction signal has a downward convex shape relative to a peak of the input voltage.

4. The switch control circuit of claim 1, wherein a waveform of the ripple reduction signal has a level that is lower than that of the waveform of the input voltage in a segment that includes the peak of the input voltage.

5. A switch control circuit comprising:
an output voltage detection circuit that is configured to generate an error signal indicative of an output voltage of a power supply;
a ripple reduction circuit that is configured to detect a waveform of an input voltage of the power supply, detect a magnitude corresponding to a peak voltage of the input voltage, and generate, based on the magnitude corresponding to the peak voltage, a ripple reduction signal having a waveform including at least two points having different values and smaller than corresponding points on the waveform of the input voltage;
a processing circuit that is configured to apply the ripple reduction signal to the error signal to generate an error reference signal; and
a pulse width modulation (PWM) circuit that is configured to turn off a main switch of the power supply based on the error reference signal.

6. The switch control circuit of claim 5, wherein the PWM circuit comprises:
an oscillator circuit that is configured to generate a clock signal for turning on the main switch; and
a first comparator that is configured to receive a sense signal indicative of a current through the main switch, and generate a reset signal for turning off the main switch by comparing the error reference signal to the sense signal.

7. The switch control circuit of claim 6, wherein the PWM circuit further comprises:
a latch having a set input that receives the clock signal, a reset input that receives the reset signal, and an output that generates a drive signal for controlling a switching operation of the main switch based on received signals on the set and reset inputs.

8. The switch control circuit of claim 5, wherein the output voltage detection circuit comprises:
a second comparator that is configured to receive a feedback signal corresponding to a detected level of the output voltage of the power supply, and compare the feedback signal to a reference signal to generate the error signal.

9. The switch control circuit of claim 5, wherein the ripple reduction circuit comprises:
an input voltage detection circuit that is configured to detect the waveform of the input voltage, and sample and hold the waveform of the input voltage to generate an input voltage waveform signal;
a peak detection circuit that detects the magnitude corresponding to the peak voltage of the input voltage based on the input voltage waveform signal; and
a modulation circuit that is configured to generate the ripple reduction signal based on the magnitude corresponding to the peak voltage of the input voltage detected by the peak detection circuit.

10. The switch control circuit of claim 5, wherein the waveform of the ripple reduction signal has a downward convex shape relative to a peak of the input voltage.

11. The switch control circuit of claim 5, wherein the waveform of the ripple reduction signal has a level that is lower than that of the waveform of the input voltage in a modulation phase segment that includes the peak of the input voltage.

12. The switch control circuit of claim 5, wherein the processing circuit is configured to multiply the error signal and the ripple reduction signal to generate the error reference signal.

13. A method of controlling a switching operation of a main switch of a power supply, the method comprising:
- generating an error signal that is indicative of an output voltage of the power supply;
- detecting a waveform of an input voltage of the power supply;
- detecting a magnitude corresponding to a peak voltage of the input voltage;
- generating, based on the magnitude corresponding to the peak voltage, a ripple reduction signal having a waveform that includes at least two points having different values and smaller than corresponding points on the waveform of the input voltage;
- applying the ripple reduction signal to the error signal to generate an error reference signal; and
- turning off a main switch of the power supply based on the error reference signal.

14. The method of claim 13, wherein generating the error signal comprises:
- receiving a feedback signal corresponding to a detected level of the output voltage; and
- comparing the feedback signal to a reference signal to generate the error signal.

15. The method of claim 13, wherein turning off the main switch comprises:
- generating a clock signal that turns on the main switch;
- receiving a sense signal indicative of a current through the main switch;
- generating a reset signal for turning off the main switch by comparing the error reference signal to the sense signal; and
- controlling the switching operation of the main switch based on a state of the clock signal and a state of the reset signal.

16. The method of claim 13, further comprising:
- sampling and holding the waveform of the input voltage to generate an input voltage waveform signal; and
- detecting the magnitude corresponding to the peak voltage of the input voltage based on the input voltage waveform signal.

17. The method of claim 13, wherein the waveform of the ripple reduction signal has a downward convex shape relative to a peak of the input voltage.

18. The method of claim 13, wherein the waveform of the ripple reduction signal has a level that is lower than that of the waveform of the input voltage in a modulation phase segment that includes the peak of the input voltage.

19. The method of claim 13, wherein applying the ripple reduction signal to the error signal comprises generating a product of the error signal and the ripple reduction signal.

\* \* \* \* \*